Nov. 23, 1943.　　　R. E. BAUER　　　2,335,100
MACHINE TOOL COOLANT TEMPERATURE CONTROL
Filed April 15, 1940　　　2 Sheets-Sheet 1
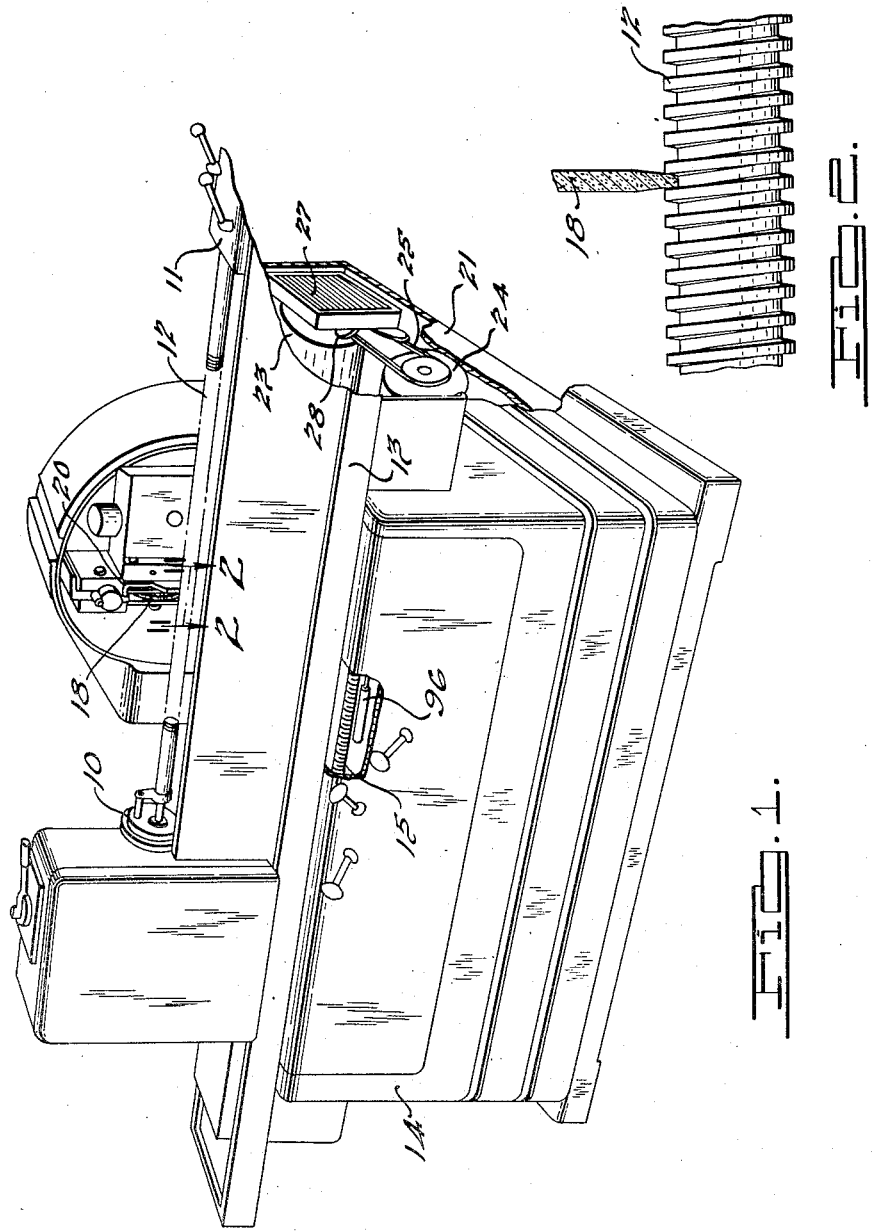
INVENTOR
Russell E. Bauer.
BY
Harness, Dickey & Pierce.
ATTORNEYS.

Nov. 23, 1943.    R. E. BAUER    2,335,100
MACHINE TOOL COOLANT TEMPERATURE CONTROL
Filed April 15, 1940    2 Sheets-Sheet 2
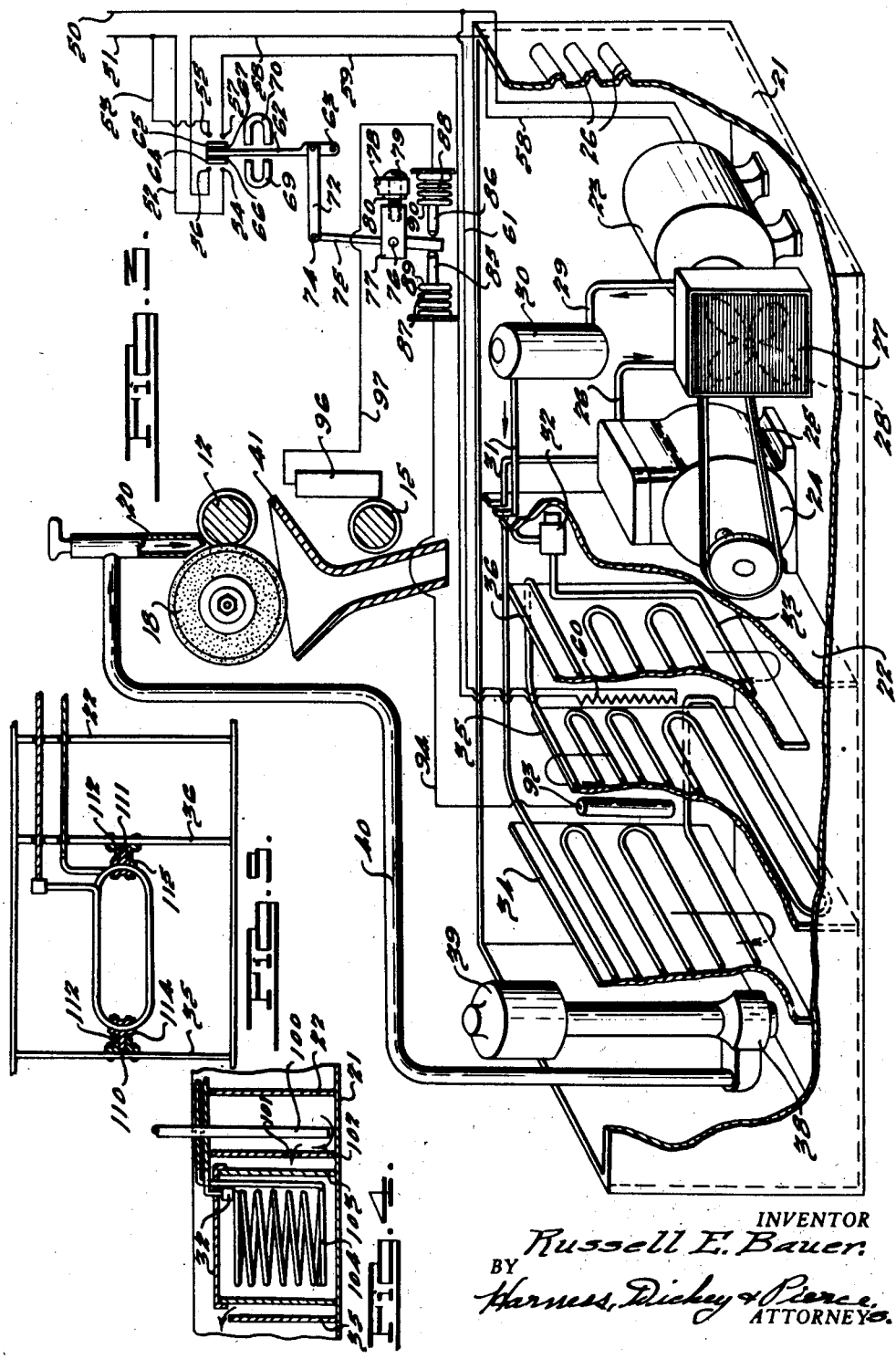
INVENTOR
*Russell E. Bauer*
BY
*Harness, Dickey & Pierce*
ATTORNEYS.

Patented Nov. 23, 1943

2,335,100

UNITED STATES PATENT OFFICE 2,335,100

MACHINE TOOL COOLANT TEMPERATURE CONTROL

Russell E. Bauer, Detroit, Mich., assignor to Ex-Cell-O Corporation, Detroit, Mich., a corporation of Michigan Application April 15, 1940, Serial No. 329,634

8 Claims. (Cl. 51—266)

The invention relates generally to machine tools, and it has particular relation to an arrangement and means for controlling the temperature of the coolant used during operation of the machine.

It is fundamental that changes in temperature effect corresponding changes in the dimensions of metal and that an increase in temperature effects a corresponding increase in the dimensions of the metal, whereas a decrease in temperature causes contraction or decrease in the dimensions of the metal. This variation is of especial significance in precision machine tool operations where it is desired to obtain highly accurate results. As an example of machines wherein a high degree of precision is desired, a thread grinding machine may be considered wherein the threads on a long work piece such as a lead screw are being ground and the linear movements of the screw are governed by a master lead screw in the grinding machine. It may be noted initially that heat generated by engagement of the grinding wheel with the threads of the screw constitutes an important factor tending to elongate the screw, and if the increase in temperature is not counteracted, the precision in the finished work will suffer accordingly. Furthermore, the temperature and dimensions of the lead screw being ground will gradually increase as the grinding wheel progresses along its length unless, as stated, this increase in temperature is counteracted. Changes in room temperature will also effect a change in length or dimensions of the master lead screw and unless some factor compensates for the temperature changes, the precision obtained will vary accordingly.

Liquid coolant is an ordinary and well known means for maintaining the work at a lower temperature and while its use promotes precision, the use of the coolant alone, under ordinary conditions, will not compensate for or offset the different temperature factors that may exist. For example, the coolant initially may have a relatively low temperature, and thus in initial machining or grinding operations on the work, the heat absorbed by the coolant may be relatively greater than that absorbed after the temperature of the coolant has increased after continuously absorbing heat from the work. Hence, the temperature conditions of the work and coolant at the starting of the machining or grinding operation may be considerably different from the temperature conditions of the work or coolant at a different stage of the machining or grinding operation. Furthermore, these temperature conditions may vary appreciably from the temperature of the master lead screw governing the feeding movement of the work.

The foregoing illustrates some of the reasons why lack of and variations in precision will occur in machining or grinding operations. This lack of or variation in the precision obtained is of considerable importance, especially in the case of grinding threads on lead screws that subsequently are used in other machines for governing precision operations.

One object of the invention is to provide improved means for automatically controlling temperature factors or conditions affecting the precision in machine tool operations, to the end that a higher degree of precision will be obtainable.

Another object of the invention is to provide refrigeration means for automatically controlling various temperature factors in a machine tool.

Another object of the present invention is to provide improved means for controlling the temperature of the coolant employed in a machine tool, to the end that the temperature of the coolant may be related to other temperature factors having an effect on the precision obtained.

Another object of the invention is to provide a means for automatically controlling the temperature of the coolant supplied to a machine tool and relating it to other temperature conditions in order that variations in such other temperature conditions will automatically be taken into account in the governing of the temperature of the coolant.

Other objects of the invention will become apparent from the following description, the drawings relating thereto, and from the claims set forth.

For a better understanding of the invention, reference may be had to the accompanying drawings forming a part of the specification, wherein:

Figure 1 is a general view in perspective, illustrating a thread grinding machine wherein one form of the invention is incorporated;

Fig. 2 is a fragmentary cross-sectional view, on a larger scale, taken substantially along the line 2—2 of Fig. 1, illustrating the manner in which the threads on a lead screw are ground in the machine shown by Fig. 1;

Fig. 3 is a generally diagrammatic view, illustrating heat exchange means constructed according to one form of the invention for automatically controlling the temperature of coolant supplied to the machine tool shown by Fig. 1;

Fig. 4 is a fragmentary, cross-sectional view of an evaporator compartment in the coolant tank, as constructed according to another form of the invention; and Fig. 5 is a fragmentary plan view of the evaporator compartment of the coolant tank, as constructed according to another form of the invention.

Referring to Fig. 1, the machine tool illustrated comprises a rotary spindle 10 and a tail piece 11 for holding and driving the work, which in this case is a long lead screw 12. The supporting and driving means for the work are mounted on a slide 13 movable on the base 14 of the machine, and movement of the slide may be governed by a master lead screw 15, as will be readily understood by those skilled in the art. In the case of precision grinding of a lead screw 12, such as shown, the latter usually will turn slowly, and the master lead screw will turn correspondingly in order to properly advance the work as it turns.

A thread grinding wheel 18, driven at a high rate of speed, has its peripheral edge portion formed, as shown by Fig. 2, to fit between the threads on the lead screw 12, so as to grind the bottom and sides of the thread. It may be now appreciated that if the lead screw 12 is properly advanced in correspondence with its rotary movement, the grinding wheel 18 will follow the thread.

A tube 20 shown terminating adjacent the grinding wheel 18 is adapted to supply coolant to the work at the point where the grinding wheel engages the work. Generally, it may be stated here that coolant is pumped from a tank to the pipe 20 and, after flowing over the work, it drains back to the tank.

Referring now to Fig. 3, the coolant tank is indicated at 21, and is shown as having a tight partition 22 dividing it into two parts, one of which is adapted to receive the coolant and the other to contain operating parts of a refrigerating unit. The motor for the unit is indicated at 23, the compressor at 24, and a belt drive between the motor and compressor is indicated at 25. Refrigerant from the compressor is pumped to a condenser 27, which is cooled by a fan 28 driven by motor 23, and from the condenser, the refrigerant flows through a conduit 29 to a reservoir 30. Louvres 26 may be provided as usual to promote circulation of air for the purpose of cooling the condenser as will be readily understood. From the reservoir 30, the refrigerant flows through a conduit 31 to an expansion valve 32 and then expands into a coil evaporator 33. In the present instance, the evaporator is mounted on three partitions indicated at 34, 35, and 36, and it is to be understood that it may be fastened in place thereon by any suitable means. It is to be further understood that the partitions preferably are made of metal and that they provide large heat absorption surfaces, thereby reducing the temperature differentials between the coolant and evaporator surfaces.

The partition 36 has its lower edge spaced from the bottom of the coolant tank in order that coolant may flow under the partition and into the space between partitions 35 and 36. Partition 35 extends to the bottom of the coolant tank but its upper edge is lower than the upper edge of partition 36 so that coolant between partitions 35 and 36 will flow over the upper edge of the former portion and into the space between partitions 34 and 35. Partition 34, like partition 36, has its lower edge spaced from the bottom of the tank while its upper edge is above the upper edge of partition 35. Thus, coolant between the partitions 22 and 36 will flow under the edge of the latter and into the space between partitions 35 and 36, then over the upper edge of partition 35 and into the space between partitions 34 and 35, then under the lower edge of partition 34 and into a space at the end of the coolant tank between the partition 34 and the end wall. In this latter space, coolant pump 38 is provided which is driven by an electric motor 39 so located so as to be above the coolant. It will be understood that during operation of the machine tool, the pump will constantly be operating to supply coolant to the work and grinding wheel.

From the pump 38, the coolant flows through a conduit 40 leading to the tube 20, shown also in Fig. 1, and after the coolant flows over the work 12 and grinding wheel 18, it drains into a funnel-like member 41 that leads to the compartment between partitions 22 and 36 in the coolant tank.

As the coolant flows over the work, the former will absorb heat generated in the grinding operation, and hence the temperature of the coolant will increase. Necessarily, also foreign matter resulting from the grinding operation becomes mixed with the coolant, but sedimentation may occur mainly in the compartment between the partitions 22 and 36 and then to a lesser extent in other compartments, so that before being recirculated, the coolant is relatively free of sediment. As the coolant flows from one partition to the other, it contacts the evaporator coils and the large surfaces of the partitions which are cooled by the evaporator coils, from which it follows that the temperature of the coolant may be lowered substantially.

For controlling operation of the motor 23, incoming power lines 50 and 51 are shown and the line 50 leads directly to the motor whereas the line 51 is branched at 52 and 53 and the branches lead to terminals 54 and 55 of a double throw switch. Other terminals 56 and 57 of the switch are connected to lines 58 and 59, with the line 58 extending to the motor 23 and the line 59 connected to a heating coil 60 disposed in the coolant tank between the partitions 35 and 36. The opposite side of the heating coil is connected by a line 61 to the power line 50.

From the foregoing description, it will be apparent that if the contacts 54 and 56 are closed, the motor 23 will operate so as to cause operation of the refrigerating unit, whereas if the switch terminals 55 and 57 are closed, the heating coil 60 will be energized to effect an increase in the temperature of the coolant. It may be mentioned here that the heating coil 60 may not at all times be essential or necessary, since in some cases, the warming up of the coolant by flowing over the work may be sufficient.

For closing either of the circuits, a common switch arm 62 may be employed and this is pivotally mounted on a stationary support as indicated at 63. Contact plates 64 and 65, insulated from the arm by plates 66 and 67, may be provided at opposite sides of the arm in order to bridge the contacts 54 and 56 and 55 and 57, respectively, depending upon the direction in which the arm 62 is moved. Permanent magnets 69 and 70 are disposed at opposite sides of the arm 62 to lightly hold the contact plates 64 and 65 against the terminals 54 and 56 or 55 and 57, respectively, when the arm 62 has been swung into a position to effect contact.

For moving the arm 62, a link 72 is pivotally connected thereto adjacent the pivot 63 and such link 72 in turn is pivoted at its opposite end 74 to an arm 75 that is pivotally mounted as indicated at 76 on a block 77 which is adjustably mounted on a support 78. While the block 77 may be adjustably mounted on the support 78 in different ways, the construction shown includes a screw 79 which is slidable in an opening in the support 78 and threaded into the block 77. Thus, by turning the screw 79, the block 77 may be moved toward or from the support 78. For holding the screw in position on the support 78, a collar 80 may be mounted thereon in any suitable way so that when the screw is turned, it will not move longitudinally but will effect movement of the block 77 inwardly or outwardly with respect to the support.

Below the block 77, the arm 75 is disposed between plungers 85 and 86 projecting respectively from end walls 89 and 90 of Sylphon bellows 87 and 88. It will be apparent that fluid pressure acting on the bellows can effect movement of the arm 75 and thus finally effect actuation of the switch arm 62 so as to either energize the motor 23 or the heating coil 60, although it will be appreciated that energization or de-energization of the motor alone may occur without involving such movement of the arm 62 as to energize the coil.

Fluid pressure in the bellows 87 is increased and decreased depending upon vaporization of a suitable fluid in a bulb 93 located in the compartment between partitions 34 and 35 of the coolant tank. This bulb is connected to the bellows 87 by means of a small conduit 94 from which it follows that any change in fluid pressure in the bulb 93 will effect a corresponding change in the bellows and a change of pressure on the end wall 89. Similarly, fluid pressure in the bellows 88 depends upon vaporization of fluid in a bulb 96 that is preferably located adjacent the master lead screw 15, and which is connected to a conduit 97 extending to the bellows. It is to be noted that the two pressures thus become opposed to each other in so far as movement of the arm 75 is involved.

Normally, it is desirable to maintain the work approximately at room temperature or maintain it at approximately the same temperature as that of the master screw 15, and this is an important reason for the bulb control 96 as will presently be seen. When the thread grinding operation begins and the coolant is flowing over the work and grinding wheel, the temperature of the work will tend to increase due to the grinding operation and the coolant normally will absorb heat from the work and then will flow back into the coolant tank. If the temperature of the coolant increases sufficiently, the pressure in bulb 93 and bellows 87 will exceed that in bellows 88 and thus end wall 89 will move arm 75 to close the motor circuit, thus energizing the refrigeration unit. As a result, the temperature of the coolant decreases and this will continue until the decrease in pressure in bulb 93 and bellows 87 allows the arm 75 to be returned by end wall 90 thereby opening the switch in the motor circuit. Normally, this cycle of operation will not require such movement of arm 75 as to close the heating coil circuit and usually the refrigeration unit will repeatedly operate to maintain the temperature of the coolant within a small range so that the temperature of the coolant flowing over the work may be so governed as to maintain the temperature of the work approximately at room or other temperature desired.

With the recognition as stated hereinbefore that room temperature and the temperature of the master lead screw 15 are important factors because the latter contracts and elongates in accordance with temperature changes, the temperature responsive bulb 96 is provided to compensate for this variable factor. If the temperature of the master lead screw 15 increases it naturally increases in length and, since it is governing the movement of the work, it becomes important that the temperature of the work be changed accordingly. Pursuant to this, if the temperature adjacent the master lead screw 15 increases sufficiently, the pressure in bulb 96 will cause sufficient pressure on the end wall 90 as to effect movement of the switch arm 62 to the point where the heating coil 60 will be energized. This will increase the temperature of the coolant and in turn the temperature of the work 12 will be increased or allowed to increase. It might be said, therefore, that normally the refrigeration unit will maintain the temperature of the coolant within a desired temperature range so that the work 12 will be maintained at a desired temperature, which may be room temperature, but if the temperature adjacent the master lead screw increases sufficiently, the temperature of the coolant will automatically be raised by energizing of the heating coil 60.

What really happens is that the pressure in bulb 96 definitely governs the range of temperature operation of the refrigeration unit in that it provides a variable resistance to movement of the arm 75. Assuming that the refrigeration unit as controlled by the bulb 93 is operating in one range of temperature, any increase in fluid pressure in the bulb 96 as occasioned by increase in room temperature or increase in temperature adjacent the master screw 15, will increase the pressure in bellows 88, and thus increase the pressure applied by the end wall 90 against the lower end of the arm 75 and this in turn will create greater resistance to movement of the arm 75 by the bellows 87. Hence, before the motor energizing switch can close, the pressure in bulb 93 must increase a greater amount to overcome the increase in pressure in bellows 88. In terms of temperature it follows then that the motor 23 would be energized and cut out at the ends of a higher range of temperature of the coolant. Conversely, if the room temperature or temperature adjacent the master lead screw decreased, the pressure in bulb 96 would decrease, thereby decreasing the resistance to movement of arm 75 by pressure in bulb 93, and the temperature of the coolant would be held in a lower range. It follows that the resistance to movement of arm 75 by bellows 87 varies in correspondence with increase and decrease in temperature of the room or in the vicinity of the master screw 15. If, at the beginning of a day's operation, the room temperature should be low, the coolant likewise will be at a lower temperature and with the beginning of the grinding operation, the refrigeration unit would function as usual except that the range of temperature of the coolant maintained would be lower, all to the end that the temperature of the work 12 would be maintained at a lower temperature. As the temperature of the room increases, and therefore the temperature of the master screw 15 increases, the pressure in bulb 96 will increase and bellows 88 will exert a greater force on the lower end of arm 75 in order to maintain the refrigeration unit inoperative. Then, as the coolant warms up due to heat absorbed from the work and from the increased room temperature, the pressure in bulb 93 will increase so as to cause operation of the refrigeration unit.

With respect to the adjusting screw 79, it will be apparent that by adjusting the screw and changing the position of the block 77, an adjustable pressure differential may be maintained between the bellows 87 and 88 which makes it possible to maintain an adjustable differential between the coolant temperature and the temperature governing the bulb 96. The effect of this would be that the two bellows will balance against each other with the switch arm in a different position, or, in other words, they will balance against each other with the coolant at one temperature and the air at a temperature different therefrom depending upon the amount of adjustment made. Under certain conditions, it might be desirable to maintain or vary a differential of temperature.

Under operating conditions which always tend to result in excess of temperature of the coolant and/or the work piece 12 with respect to the feeding means 15 and/or the ambient temperature of the machine, the heating coil 60, its electrical feeding conductors 59 and 61, switch contacts 55 and 57, conductor 53, retaining magnet 70 and contact 65 with insulation 67 may be omitted as, under the last named conditions the addition of heat to the coolant by means of coil 60 will never be necessary. The thus altered apparatus will continue to function in the manner previously described causing energization of motor 23 and removal of heat from the coolant by action of the refrigeration unit upon sufficient increase of the coolant temperature in relation to the temperature of bulb 96 or upon lowering of the last named temperature in respect to the temperature of bulb 93. The occurrence of temperature ambient to bulb 93 which is too low in relation to the temperature of bulb 96 is avoided by non-contact of 64 with 54 and 56 and consequent de-energization of motor 23 and inactivity of the associated refrigerating unit, and during this phase, the accumulation of heat occurs in the coolant until sufficient to again close said contacts and start the refrigeration unit.

In the modified form of coolant tank shown by Fig. 4, the coolant return leading to the first compartment is indicated at 100, and the first coolant partition wall indicated at 102 has a slot opening 101 substantially above the bottom of the tank. The second partition wall is indicated by the same numeral 35 as applied in Fig. 3, and the compartment between the two walls 35 and 102 has a brine tank 103 located therein which may be filled with any suitable brine solution. Within this brine tank, an evaporator coil indicated 104 is placed, and this evaporator coil is connected to the compressor and the reservoir of the refrigeration unit in the same manner as previously described. Thus, in this case, the coolant flows around large surfaces that are cooled by the brine, which in turn is cooled by the evaporator coil within the brine. This arrangement avoids collection of sediment on the coils and is effective to avoid undesirably chilled surfaces which contact the coolant, since the brine would not be maintained at an extremely low temperature owing to its volume as compared to the size of the evaporator coil.

The plane surfaces of the brine tank do not tend to collect sediment as may occur to a certain extent on coils disposed directly in the coolant, and, furthermore, these surfaces, being smooth, may be easily cleaned, whereas some difficulty would be incurred in cleaning coils. Again, it may be advantageous to so proportion the area of the coil surfaces to the volume of medium or brine around the coil, and the area of the external surfaces of the brine tank in contact with the coolant, that for a given rate of heat transfer, there would be a lesser temperature differential between the coolant and the brine than there would be between the brine and the surface of the evaporator coil. One desirable effect of maintaining a small differential between the brine and coolant temperatures is that the coolant on the surfaces of the brine tank will not be sufficiently chilled as to cause the efficiency of heat transfer to be impaired by the accumulation thereon of gummy or waxlike substances apt to be deposited from the coolant if subjected to excessive local reduction in temperature.

In the arrangement shown by Fig. 5, the compartments in the coolant tank may be the same as those shown by Fig. 3, but in this case the two walls 35 and 36 are provided with guideways 110 and 111 formed by angle irons 112 fastened to the walls, and these guideways receive guide elements 114 and 115 that form part of coil retaining means for retaining the evaporator coils assembled. It will be apparent in this case that the evaporator coil may be easily lifted from the compartment so as to facilitate cleaning it, and it should be mentioned here that lines connecting the coil to the rest of the refrigerating unit are sufficiently flexible so as to permit this operation.

In the specific embodiment of the invention herein described, differentially opposed Sylphons have been shown as a part of the temperature responsive means by which the operation of heating and/or cooling means may be controlled, to the end that the temperature of a workpiece may be related to a reference temperature such as the ambient temperature of a machine, the temperature of the machine itself, or to that of some specific part thereof. It is to be understood that the invention may be used in precision work where cutting tools other than thread grinders are employed and to that end, the term "cutting" as included in the claims is to be understood as including "grinding". However, it will be apparent to those skilled in the art that various other organizations of temperature responsive means may be used for effecting the results stated and that various other modifications of the invention may be made without departing from the scope of the appended claims.

What is claimed is:

1. The combination in a machine tool arrangement, a cutting element for removing material from a workpiece, means for supporting the workpiece, feed control means for moving the element and workpiece relatively so as to effect a progressive cutting operation, a fluid coolant medium, means for effecting a flow of the medium over the work during the cutting operation, heat exchange means for controlling the temperature of the medium, automatic control means depending upon the temperature of the medium for governing operation of the heat exchange means, automatic control means depending upon the temperature adjacent the feed means for governing operation of the heat exchange means, and means interrelating the two control means so that the temperature of the medium is maintained in approximately a definite relation to the temperature adjacent the feed means.

2. The combination in a machine tool arrangement, a cutting element for removing material from a workpiece, means for supporting the workpiece, feed control means for moving the element and workpiece relatively so as to effect a progressive cutting operation, a liquid coolant medium and a tank therefor, means for effecting a flow of the medium over the work during the cutting operation and return of the coolant to the tank, a refrigeration unit for absorbing heat from the medium and including an evaporator associated with the medium, and, thermoresponsive means responsive to and operable by the temperature of the coolant medium for governing operation of the refrigeration unit, thermoresponsive means responsive to and operable by the temperature adjacent the feed means for governing operation of the refrigeration unit, and means interrelating the two thermoresponsive means so that the temperature of the coolant is maintained in approximately definite relation to the temperature adjacent the feed means.

3. The combination in a machine tool arrangement, a cutting element for removing material from a workpiece, means for supporting the workpiece, feed control means for moving the element and workpiece relatively so as to effect a progressive cutting operation, a liquid coolant medium and a tank therefor, means effecting a flow of the medium over the work during the cutting operation and return of the coolant to the tank, a refrigeration unit for absorbing heat from the medium and including an evaporator associated with the medium, a temperature control bulb in the coolant tank and operable by thermal expansion of fluid in the bulb to provide a variable pressure, a similar bulb control adjacent the feed means, and means governed by the fluid pressures in said bulbs for governing operation of the refrigeration unit.

4. The combination in a machine tool arrangement, a cutting element for removing material from a workpiece, means for supporting the workpiece, feed control means for moving the element and workpiece relatively so as to effect a progressive cutting operation, a liquid coolant medium and a tank therefor, means effecting a flow of the medium over the work during the cutting operation and return of the coolant to the tank, a refrigeration unit for absorbing heat from the medium and including an evaporator associated with the medium, a temperature control bulb in the coolant tank and operable by thermal expansion of fluid therein to provide a variable pressure, a similar bulb control adjacent the feed means, and means governed by the fluid pressures in said bulbs for governing operation of the refrigeration unit, said last mentioned means including pressure responsive devices disposed in opposition to each other and a control element movable by a differential between the two fluid pressures.

5. The combination in a machine tool arrangement, a cutting element for removing material from a workpiece, means for supporting the workpiece, feed control means for moving the element and workpiece relatively so as to effect a progressive cutting operation, a liquid coolant medium and a tank therefor, means effecting a flow of the medium over the work during the cutting operation and return of the coolant to the tank, a refrigeration unit for absorbing heat from the medium and including an evaporator associated with the medium, a temperature control bulb in the coolant tank and operable by thermal expansion of fluid therein to provide a variable pressure, a similar bulb control adjacent the feed means, a pressure responsive electric switch for controlling operation of the refrigeration unit, and means governed by differentials in the two fluid pressures for operating the switch.

6. The combination in a machine tool arrangement, a cutting element for removing material from a workpiece, means for supporting the workpiece, feed control means for moving the element and workpiece relatively so as to effect a progressive cutting operation, a liquid coolant medium and a tank therefor, means effecting a flow of the medium over the work during the cutting operation and return of the coolant to the tank, a refrigeration unit for absorbing heat from the medium and including an evaporator associated with the medium, a temperature control bulb in the coolant tank and operable by thermal expansion of fluid therein to provide a variable pressure, a similar bulb control adjacent the feed means, a pressure responsive switch for controlling operation of the refrigeration unit, means governed by differentials in the two pressures for operating the switch, and adjustable means for adjustably varying the operation of the switch by the differentials in pressure.

7. The combination in a machine tool arrangement, a cutting element for removing material from a workpiece, means for supporting the workpiece, feed control means for moving the element and workpiece relatively so as to effect a progressive cutting operation, a fluid coolant medium, means for effecting a flow of the medium in a clearly defined closed circuit during which it flows over the workpiece, heat exchange means operable at one place in the circuit for controlling the temperature of the medium, and means for automatically governing operation of the heat exchange means and including a control means depending upon the temperature of the medium and a control means depending upon the temperature of the space in which the machine is located.

8. The combination in a machine tool arrangement, a cutting element for removing material from a workpiece, means for supporting the workpiece, feed control means including a lead screw for moving the element and workpiece relatively so as to effect a progressive cutting operation, a fluid coolant medium, means for effecting a flow of the medium in a clearly defined circuit during which it flows over the workpiece, heat exchange means operable at one place in the circuit for controlling the temperature of the medium, and means for automatically governing operation of the heat exchange means, and including a control means depending upon the temperature of the medium and a control means depending upon the temperature ambient to the lead screw.

RUSSELL E. BAUER.